United States Patent
Wang et al.

(10) Patent No.: US 10,597,534 B2
(45) Date of Patent: Mar. 24, 2020

(54) CHEMICALLY RESISTANT THERMOPLASTIC COMPOSITIONS

(71) Applicant: DSM IP ASSETS B.V., Heerlen (NL)

(72) Inventors: Zhujuan Wang, Echt (NL); Johannes Hoekstra, Echt (NL); Pim Gerard Anton Janssen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 173 days.

(21) Appl. No.: 15/515,631

(22) PCT Filed: Sep. 29, 2015

(86) PCT No.: PCT/EP2015/072375
§ 371 (c)(1),
(2) Date: Mar. 30, 2017

(87) PCT Pub. No.: WO2016/050743
PCT Pub. Date: Apr. 7, 2016

(65) Prior Publication Data
US 2017/0298225 A1    Oct. 19, 2017

(30) Foreign Application Priority Data
Oct. 3, 2014    (EP) ..................................... 14187591

(51) Int. Cl.
| | | |
|---|---|---|
| *C08L 77/06* | (2006.01) | |
| *C08K 3/08* | (2006.01) | |
| *C08G 69/26* | (2006.01) | |
| *C08L 77/02* | (2006.01) | |
| *C08K 7/14* | (2006.01) | |

(52) U.S. Cl.
CPC ............ *C08L 77/06* (2013.01); *C08G 69/265* (2013.01); *C08K 3/08* (2013.01); *C08K 7/14* (2013.01); *C08L 77/02* (2013.01); *C08L 2201/08* (2013.01); *C08L 2205/025* (2013.01)

(58) Field of Classification Search
CPC .................. C08L 77/06; C08L 2201/08; C08L 2205/025; C08L 77/02; C08G 69/265; C08K 3/08; C08K 7/14
USPC ........................................................ 524/413
See application file for complete search history.

(56) References Cited

U.S. PATENT DOCUMENTS 8,383,244 B2    2/2013  Bayer et al.
2008/0146718 A1 *  6/2008  Gijsman .................. C08K 3/08
                                                     524/439

FOREIGN PATENT DOCUMENTS

| EP | 0392602 A1 * | 10/1990 | ............. C08K 5/092 |
| EP | 2431419 A1 * | 3/2012 | ............. C08L 77/06 |
| WO | WO 2012/168442 | 12/2012 | |
| WO | WO 2013/068326 | 5/2013 | |

OTHER PUBLICATIONS

International Search Report for PCT/EP2015/072375, dated Dec. 9, 2015, 3 pages.
Written Opinion of the ISA for PCT/EP2015/072375, dated Dec. 9, 2015, 9 pages.

* cited by examiner

*Primary Examiner* — Josephine L Chang
(74) *Attorney, Agent, or Firm* — Nixon & Vanderhye P.C.

(57) ABSTRACT

The present invention relates to a thermoplastic composition comprising: a) a polyamide component comprising at least three amide monomer units and b) a stabilizer characterized in that at least one of the at least three amide monomer units is an aliphatic amide monomer unit having a carbon to nitrogen ratio (C/N) equal to, or above 6.5, in that at least two of the at least three amide monomer units are semi-aromatic amide monomer units which polymerized provide at least one semi-crystalline semi-aromatic polyamide having a melting temperature of at least 290° C. as measured by DSC at a heating rate of 10° C./min according to standard ISO 1 1357-3 (2009), and in that the amount of aliphatic amide monomer unit is in the range from 20 to 60 wt. % relative to the total weight of the at least three amide monomer units in the polyamide components and the total amount of semi-aromatic amide monomer units is in the range from 40 to 80 wt. % relative to the total weight of the at least three amide monomer units in the polyamide components and characterized in that the stabilizer is chosen from a copper-containing stabilizer, an iron-containing stabilizer and a stabilizer containing copper and iron.

12 Claims, No Drawings ated herewith. More preferably, the 'polyamide component' is a blend of at least one homopolyamide being an aliphatic polyamide and of a copolyamide being a semi-crystalline semi-aromatic polyamide consisting of at least two (different) amide monomer units, wherein the amide monomer units are defined as designated herewith. Advantageously, the polyamide component a) can be a blend of an aliphatic polyamide (having one amide monomer unit) and a semi-aromatic copolyamide comprising at least two amide monomer units (thereby making in total at least three amide monomer units in component a)).

CHEMICALLY RESISTANT THERMOPLASTIC COMPOSITIONS

This application is the U.S. national phase of International Application No. PCT/EP2015/072375 filed 29 Sep. 2015, which designated the U.S. and claims priority to EP Patent Application No. 14187591.4 filed 3 Oct. 2014, the entire contents of each of which are hereby incorporated by reference.

The present invention relates to a thermoplastic composition which is heat resistant and chemical resistant.

There is a continuous industrial need for thermoplastic compositions which are chemically resistant, in particular when exposed to high temperatures and/or for thermoplastic composition which are heat resistant when exposed to a chemically aggressive environment.

Therefore, it is a goal of the present invention to provide a chemically resistant thermoplastic composition which is also heat resistant. This goal, amongst other goals, is achieved by the composition according to the present invention, said composition comprising:
a) a polyamide component comprising, advantageously consisting of, at least three amide monomer units and
b) a stabilizer
characterized in that
at least one of the at least three amide monomer units is an aliphatic amide monomer unit having a carbon to nitrogen ratio (C/N) equal to, or above 6.5,
at least two of the at least three amide monomer units are semi-aromatic amide monomer units which polymerized provide at least one semi-crystalline semi-aromatic polyamide having a melting temperature of at least 290° C. (preferably at least 300° C., more preferably 310° C., most preferably at least 330° C.) as measured by DSC at a heating rate of 10° C./min according to standard ISO 11357-3 (2009),
the amount of aliphatic amide monomer unit is in the range from 20 to 60 wt. % relative to the total weight of the at least three amide monomer units in the polyamide component and the total amount of semi-aromatic amide monomer units is in the range from 40 to 80 wt. % relative to the total weight of the at least three amide monomer units in the polyamide component and
the stabilizer is chosen from a copper-containing stabilizer, an iron-containing stabilizer and a stabilizer containing copper and iron.

The thermoplastic composition according to the present invention is chemically resistant at high temperatures and/or is heat resistant when exposed to low pH values. The term 'resistant to high temperatures and/or to aggressive chemical exposure' is herewith to be understood as 'not degrading', e.g. no sign of discoloration and/or no sign of any alteration of a surface, no softening, no swelling, no detachment of coatings when the composition is used as a coating on a different material, no blistering is observed after an extended period of time.

The synergic effect of the presence of the at least three polyamides (component a)) with the stabilizer (component b)) as recited in the thermoplastic composition according to the present invention is that the thermoplastic composition is a polyamide-containing composition which shows improved resistance when exposed to particularly low pH aqueous solutions, and has as well excellent heat aging properties and/or mechanical properties, compared to thermoplastic compositions which do not comprise components a) and b) as recited herewith.

In the context of the present invention, the term 'polyamide component' is to be understood as:
a copolyamide consisting of at least (different) three amide monomer units; or
a blend of at least one homopolyamide (the homopolyamide being defined as comprising one amide monomer unit) and of a copolyamide consisting of, at least two (different) amide monomer units; or
a blend of two copolyamides each consisting of at least two (different) amide monomer units;
a blend of at least three polyamides as defined in the present invention (thereby comprising at least three amide monomer units in component a)), wherein the amide monomer units are defined as designated herewith. Preferably, the 'polyamide component' is a blend of at least one homopolyamide (the homopolyamide being defined as comprising one amide monomer unit) and of a copolyamide consisting of at least two (different) amide monomer units, wherein the amide monomer units are defined as designated herewith. More preferably, the 'polyamide component' is a blend of at least one homopolyamide being an aliphatic polyamide and of a copolyamide being a semi-crystalline semi-aromatic polyamide consisting of at least two (different) amide monomer units, wherein the amide monomer units are defined as designated herewith. Advantageously, the polyamide component a) can be a blend of an aliphatic polyamide (having one amide monomer unit) and a semi-aromatic copolyamide comprising at least two amide monomer units (thereby making in total at least three amide monomer units in component a)).

In the context of the present invention, the term 'amide monomer unit' is a unit made of a dicarboxylic acid and a diamine which constitutes a monomer or an amino-acid which constitutes a monomer. The monomer is in the context of the present invention polymerized to form a homopolymer or a copolymer having a semi-aromatic amide monomer unit and/or an aliphatic amide monomer unit fulfilling the features as defined herewith.

In the context of the present invention, the term "at least two of the at least three amide monomer units are semi-aromatic amide monomer units which polymerized have a melting temperature of at least 290° C." is to be understood that said semi-aromatic amide monomer units are amide elements of the polyamide component which can be present in the polyamide component as individual polyamides (homopolymers which would be blended) each having a melting temperature of at least 290° C., or which can be present in the polyamide component as a copolyamide having a melting temperature of at least 290° C. as measured by DSC at a heating rate of 10° C./min according to standard ISO 11357-3 (2009). Therefore, the semi-aromatic amide monomer units which are polymerized can be individually polymerized (as two homopolyamides) or polymerized as a copolyamide.

According to the present invention, it is an advantage when the amount of aliphatic amide monomer unit is in the range from 30 to 50 wt. % relative to the total weight of the at least three amide monomer units in the polyamide components and the amount of semi-aromatic amide monomer units is in the range from 50 to 70 wt. % relative to the total weight of the at least three amide monomer units in the polyamide component. With this feature, the chemical resistance and the heat aging resistance are both increased. In the context of the present invention, the ranges provided herewith include the lower and upper limits of the range.

In the context of the present invention, the term "at least two" is to be understood as two or more, three or more, four or more, five or more and the term "at least three" is to be understood as three or more, four or more, five or more, six or more. In all of the above (and following) embodiments, the polyamides present in the polyamide component a) are present in an (total) amount of aliphatic polyamide(s) in the range from 20 to 60 wt. % relative to the total weight of the polyamide component a) and the total amount of semi-crystalline semi-aromatic polyamide is in the range from 40 to 80 wt. % relative to the polyamide component a).

According to one embodiment of the present invention, component a) is a blend of one aliphatic polyamide having a carbon to nitrogen ratio (C/N) equal to, or above 7 and a copolymer of at least two semi-crystalline semi-aromatic polyamides, which copolymer has a melting temperature of at least 290° C. as measured by DSC at a heating rate of 10° C./min according to standard ISO 11357-3 (2009). In other words, the polyamide component a) is, or consists of, a blend consisting of:

one aliphatic polyamide originating from an aliphatic amide monomer unit having a carbon to nitrogen ratio (C/N) equal to, or above 7 and
one polyamide copolymer having a melting temperature of at least 290° C. as measured by DSC at a heating rate of 10° C./min according to standard ISO 11357-3 (2009), (copolymer) originating from (the polymerization of) at least two semi-aromatic amide monomer units.

According to another embodiment of the present invention, component a) is a blend of at least four polyamides consisting of two aliphatic polyamides, one of which has a carbon to nitrogen ratio (C/N) equal to, or above 6 and one of which has a having a carbon to nitrogen ratio (C/N) equal to, or above 7 and at least two semi-crystalline semi-aromatic polyamides having a melting temperature of at least 290° C. as measured by DSC at a heating rate of 10° C./min according to standard ISO 11357-3 (2009). In other words, the polyamide component a) is, or consists of, a blend consisting of:

two aliphatic polyamides, one of which has a carbon to nitrogen ratio (C/N) equal to, or above 6 and one of which has a having a carbon to nitrogen ratio (C/N) equal to, or above 7, and
one polyamide copolymer having a melting temperature of at least 290° C. as measured by DSC at a heating rate of 10° C./min according to standard ISO 11357-3 (2009), (copolymer) originating from at least two semi-aromatic amide monomer units.

According to another embodiment of the present invention, component a) is a blend of at least four polyamides consisting of two aliphatic polyamides, one of which has a carbon to nitrogen ratio (C/N) equal to, or above 6 and one of which has a having a carbon to nitrogen ratio (C/N) equal to, or above 7 and at least two semi-crystalline semi-aromatic polyamides having a melting temperature of at least 290° C. In other words, the polyamide component a) is, or consists of, a blend consisting of:

one aliphatic polyamide having a carbon to nitrogen ratio (C/N) equal to, or above 7 and
one polyamide copolymer having a melting temperature of at least 290° C. as measured by DSC at a heating rate of 10° C./min according to standard ISO 11357-3 (2009) (copolymer) originating from one aliphatic monomer unit having a carbon to nitrogen ratio (C/N) equal to, or above 7 and from at least two semi-aromatic amide monomer units.

Excellent results have been obtained with at least one of the at least two semi-crystalline semi-aromatic polyamides having a melting temperature of at least 290° C. as measured by DSC at a heating rate of 10° C./min according to standard ISO 11357-3 (2009), comprises terephtalic and/or isophtalic recurring units.

Advantageously, the thermoplastic composition according to the present invention comprises component a) in an amount ranging from 20-99 wt. % relative to the total amount of the thermoplastic composition and component b) in an amount ranging from 0.2-10 wt. %, preferably from 0.4 to 3.5 wt. % relative to the total weight of the thermoplastic composition. If the stabilizer is a stabilizing system containing copper and iron (i.e. two different compounds containing copper and iron or one compound containing copper and iron), the amount given hereabove is the total amount of the stabilizer. Preferably, if the stabilizer is a copper-containing stabilizer, the stabilizer is advantageously present in an amount ranging from 0.2 to 1.0 wt. % relative to the total weight of the thermoplastic composition, and if the stabilizer is an iron-containing stabilizer, the stabilizer is advantageously present in an amount ranging from 1.6 to 3.2 wt. % relative to the total weight of the thermoplastic composition.

Surprisingly, the compositions according to the invention exhibit a very good retention of mechanical properties when exposed to aggressive chemical conditions, such as at a high temperature in an acidic pH environment: low pH values such as values below 7, or below 6.5, or below 6, or below 5.5. Excellent resistance of the thermoplastic composition according to the present invention has been observed when the pH is in the range from pH 1 to pH 6, in particular excellent results have been observed when the pH is as low as a from pH 1 to pH 4, or even below pH 3.

Advantageously in the context of the present invention, the at least one aliphatic polyamide in component a) has a carbon to nitrogen ratio (C/N) in the range from 7 to 24. In one embodiment according to the present invention, the aliphatic polyamide has a carbon to nitrogen ratio in the range from 7 to 11. In another embodiment according to the present invention, the aliphatic polyamide has a carbon to nitrogen ratio in the range from 12 to 18.

In yet another embodiment according to the present invention, the aliphatic polyamide has a carbon to nitrogen ratio in the range from 19 to 24.

Excellent results have been obtained when the aliphatic amide monomer unit of the polyamide component a) is a polyamide chosen from the group consisting of PA4,9; PA6,9; PA4,10; PA-4,12; PA-6,9; PA6,10; PA-6,12; PA8,10; PA10,10; PA12,10; PA11; PA12; PA6,12; PA4,14; PA6,14; PA8,14; PA10,14; PA18; PA4,18; PA6,18; PA8,18; PA10,18; PA4,36; PA6,36; PA8,36; PA10,36; PA-12,12; PA12,36 and polyamides obtained from 1,4-cyclohexanedicarboxylic acid (the semi-colon ";" is to be understood as a comma "," in the present list of polyamides and/or in the lists hereafter). The aliphatic polyamides according to the present invention can also be a copolyamide of the list given hereabove, provided the copolyamide has a C/N ratio of at least 6.5, preferably at least 7. According to the present invention, excellent results have been obtained when the composition according the present invention comprises semi-crystalline semi-aromatic amide monomer unit fulfilling the requirements of the present invention (which constitutes polyamides comprising said semi-crystalline semi-aromatic amide units) chosen from PA-4I and copolymer thereof; PA-4I/66-copolyamide; PA-4T and copolymers thereof, such as PA-4T/6-copolyamide; PA-4T/66-copolyamide; PA-4I/4T-copolyamide; PA-66/4; T/4I-copolyamide; PA-4T/2-MPMDT-copolyamide (2-MPMD=2-methylpentamethylene diamine), PA-4I/6T-copolyamide; PA-66/6T/4I-copolyamide; PA-6I/4T-copolyamide, PA-66/4T/6I-copolyamide;

PA-6I; PA-6I/66-copolyamide; PA-6T and copolymers thereof; PA-6T/6-copolyamide; PA-6T/66-copolyamide; PA-6I/6T-copolyamide; PA-66/6T/6I-copolyamide; PA-6T/2-MPMDT-copolyamide (2-MPMD=2-methylpentamethylene diamine); PA-9T; PA-9T/2-MOMD,T (2-MOMD = 2-methyl-1,8-octamethylenediamine); and PA 10T and copolymers thereof such as PA10T/6T; PA10T/10,6; PA10T/11; PA10T/TMHMDAT (wherein TMHMDA is trimethylhexamethylenediamine).

In the context of the present invention, excellent results have been obtained when the polyamide component a) comprises semi-aromatic amide monomer units which polymerized would form semi-aromatic polyamides such as copolyamides obtained from terephthalic acid, 2,2,4- and 2,4,4-trimethylhexamethylenediamine, copolyamide obtained from isophthalic acid, laurinlactam and 3,5-dimethyl-4,4-diaminodicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and copolyamides of the aforementioned polyamides, provided they have a melting temperature of at least 290° C. as measured by DSC at a heating rate of 10° C./min according to standard ISO 11357-3 (2009).

Other polymers, such as polyamides can be present in the thermoplastic composition according to the present invention (i.e. as additional components, such as a component c)). If an additional polyamide is present in the thermoplastic composition according to the present invention, the additional polyamide can have any aliphatic or semi-aromatic amide monomer unit. Good results have been obtained with additional polyamide, such as PA-6 and PA-6,6, and copolymers of PA-6 and PA-6,6, as well as copolymers of PA-6 and PA-6,6 with for example, PA-4,6, PA-4,8, PA-6,6, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylene-diamine. The amount of such other polyamides is preferably not above 30 wt. % of the total weight of the polyamides.

In the context of the present invention the stabilizer component b) is a copper-containing stabilizer, an iron-containing stabilizer and a stabilizer containing copper and iron. A stabilizer containing copper and/or iron (i.e. a copper-containing stabilizer, an iron-containing stabilizer, or a copper and iron-containing stabilizer) can be chosen from the group consisting of elementary copper, at least one copper salt, at least one copper oxide, elementary iron, at least one iron salt, at least one iron oxide. A stabilizer containing copper and iron can also be called a stabilizer system. Component b) can be chosen from a copper oxide, a copper salt, a salt of a copper oxide, an can be an iron oxide, an iron salt, a salt of an iron oxide, an oxide of a copper and iron alloy, a salt of copper and iron (e.g. a complex salt of copper and iron) and any combination thereof. By the term 'any combination thereof' is to be understood here as a combination of two or more of the stabilizers falling under the definition of component b). In an embodiment of the present invention, the stabilizer b) consists of
i) 20-50 wt. % of an iron-containing component
ii) 0-30 wt. % of at least one sodium salt
iii) 0-60 wt. % of a further additive
wherein the weight % is relative to the total weight of the stabilizer.

Component i) is advantageously elementary iron. Due to the presence of the further additive, for example a carrier polymer which maintains the elementary iron stable, oxidation of the active component (elementary iron) is prevented. More advantageously, the stabilizer b) comprises elementary iron. Component ii) is at least one sodium salt, such as sodium chloride or a sodium chloride-containing salt.

Component ii) can also comprise at least two sodium salts (such as two sodium salts, such as three sodium salts). In the context of the present invention, sodium salts can be sodium chloride, sodium phosphate, sodium hydrogenophosphate, sodium dihydrogenophosphate, sodium pyrophosphate or mixtures thereof. The stabilizer b) advantageously has a particulate form, preferably with a small particle size. Preferably, the stabilizer comprises particles with a particle size of less than 1 mm, preferably less than 0.1 mm. Still more preferably, the stabilizer has a median particle size (D50) of at most 0.1 mm, more preferably at most 0.01 mm and still more preferably at most 0.001 mm. The advantage of a smaller particle size and in particular a smaller median article size for the stabilizer is that the heat aging properties of the inventive composition is further improved or that the stabilizer can be used in a smaller amount for obtaining the same properties. The median particle size $D_{50}$ is determined with sieve methods, according to ASTM standard D1921-89, method A. More advantageously, the stabilizer b) consists of elementary iron and optionally some iron oxide, advantageously the elementary iron stabilizer consists of at least 80 wt. % of elementary iron relative to the total weight of the stabilizer and some iron oxide on its surface and less than 5 wt. % of other components. The stabilizer can also mainly be elementary iron (in an amount more than 80 wt. %, preferably more than 85 wt. %, more preferably more than 90 wt. % relative to the total weight of the stabilizer).

The thermoplastic composition can also comprise one or more additional components in an amount ranging from 0 to 50 wt % relative to the total weight of the thermoplastic composition. These additional components can be such as reinforcing agents, fillers, flame retardants, pigments, and other auxiliary additives like plasticizers, processing aids, such as mould release agents, further stabilizers such as antioxidants and UV stabilizers, crystallization accelerating agents or nucleating agents, impact modifiers and compatibilizers. The thermoplastic composition according to the invention may further comprise deliquescent substances, such as sodium chloride, and/or additional contributing stabilizing components such as hypophosphates like disodiumdihydrogen-hypophosphate.

These further components may comprise polymer components, for example a polymer that is used as a carrier for the stabilizer (component b)) or for a pigment, a halogenated polymeric flame retardant, or a rubber that is used, for example as an impact modifier.

As reinforcing agent for the inventive thermoplastic composition commercially available glass fibres, mineral fibres and carbon fibres, optionally surface treated for polyamides, can be used. Reinforcing agents can be used in an amount varying over a wide range, for example, from 5-60 wt. % relative to the total weight of the thermoplastic composition. Suitably, the reinforcing agent is present in an amount of 10-50 wt. %, preferably 15-40 wt. %, relative to the total weight of the thermoplastic composition.

Suitable fillers that can be used in the thermoplastic composition according to the invention include commercial fillers and inorganic minerals, like kaolin, wolastonite, mica, calciumcarbonate, and nano-fillers, optionally surface modified for polyamides. Fillers can be used in an amount varying over a wide range, for example, from 5-60 wt. % relative to the total weight of the thermoplastic composition. Suitably, the reinforcing agent is present in an amount of 10-50 wt. %, preferably 15-40 wt. %, relative to the total weight of the thermoplastic composition.

Suitable flame retardants include both halogen containing flame retardants and halogen free flame retardants. Preferably the flame retardants are selected from those types that do not detract from the heat aging properties of the thermoplastic composition according to the invention.

Preferably the total amount of fibre reinforcing agents, fillers and flame retardants is in the range of 0-60 wt. %, more preferably 15-50 wt. %, most preferably 20-45 wt. % relative to the total weight of the thermoplastic composition.

Suitable pigments that can be used in the thermoplastic composition according to the invention include black pigments like carbon black and nigrosine, which are preferably used in an amount of 0.01-5 wt. %, more preferably 0.1-1 wt. %, relative to the total weight of the thermoplastic composition.

The other auxiliary additives, apart from reinforcing agents, fillers, flame retardants and pigments, are preferably used in an amount of at most 10 wt. %, relative to the total weight of the thermoplastic composition.

A chemical and/or heat resistance for an extended period of time is to be understood as 'a longer lifetime' than thermoplastic compositions of the prior art in the same chemical and physical conditions. In other words, moulded articles comprising, or made of a composition comprising or consisting of the thermoplastic composition according to the present invention have a better chemical resistance and/or heat aging resistance when exposed to low pH values and its mechanical properties are retained as well. A high-temperature-use application for a moulded article made by the composition according to the present invention is herein understood to be an application wherein the moulded article during its normal useful lifetime is in contact with a heat source which frequently attains and/or which attains for a longer period a temperature of at least 140° C., such as at least 200° C. The heat source may be a heat producing device or a heated device or may be the surrounding environment wherein the moulded article is subjected to conditions with temperatures of at least 140° C. Such high-temperature-use applications are regularly met for articles used in the electro-, electronic, and automotive industry. Examples of heated devices or heat generating devices are engines, or elements thereof, and electronic devices such as semi-conductors. For the automotive segment high-temperature-use application are regularly found in so-called under-the-hood or under-the-bonnet applications, herein referred to as automotive parts. Therefore, the invention also relates to moulded articles for use in the electro-, electronic, and automotive industry.

Moulded articles for the electro, electronic and automotive industry and moulding compositions (such as the thermoplastic composition according to the present invention) based on thermoplastic materials used for these applications generally have to comply with a complex property profile, including, for the compositions as moulded, good dimensional stability, high heat distortion temperature (HDT) and good mechanical properties, including a high tensile strength and a high tensile modulus. As indicated above, moulded articles that serve in automotive under-the-hood applications and in several electric or electronic applications can be subjected to relatively high temperatures for a prolonged period. Therefore it is required that the moulding compositions used in these applications have a good thermal stability over extended periods of time at elevated temperature. Non-stabilized thermoplastic moulding compositions generally tend to show a decrease in mechanical properties due to thermal degradation of the polymer. This effect is called heat aging. This effect can occur to an undesirable extent. In particular with polyamides as the thermoplastic polymer, the deteriorating effect of exposure to high temperatures can be very dramatic. Generally the materials used for the indicated applications contain a heat stabilizer, also referred to as thermostabilizer. The function of a heat stabilizer is to better retain the properties of the composition upon exposure of the moulded article to elevated temperature. When using a heat stabilizer, the useful lifetime of the moulded material can be extended significantly, depending on the type of material, use conditions and type and amount of heat stabilizer or thermostabilizer. Examples of heat stabilizers typically used in, for example, polyamides are organic stabilizers, like phenolic antioxidants, organic phosphites and aromatic amines, and metal salts of Group IB, IIB, III and IV of the Periodic Table. Phenolic antioxidants and aromatic amines are generally used for stabilisation at elevated temperatures up to about 130° C. Frequently used metal salts are copper salts. Copper containing stabilizers are suitable for stabilisation at higher temperatures and have been available for many years.

In many applications for thermoplastic (moulding) compositions, retention of mechanical properties after long-term exposure to temperatures as high as 160° C., or even 180° C.-200° C. and higher becomes a basic requisite. The number of specialty applications, requiring improved heat aging properties is also increasing. Therefore, there remains a need for further compositions having good or even further improved heat stability.

In the context of the present invention, the term melting temperature is herein understood the temperature, measured by the DSC method according to ISO-11357-3 (2009), on pre-dried samples in an $N_2$ atmosphere with heating and cooling rate of 10° C./min. Herein Tm has been calculated from the peak value of the highest melting peak in the second heating cycle. With the term melting temperature is herein understood the temperature, measured by the DSC method according to ISO-11357-3 (2009), on pre-dried samples in an $N_2$ atmosphere with heating and cooling rate of 10° C./min. Herein Tm has been calculated from the peak value of the highest melting peak in the second heating cycle.

The present invention is herewith illustrated without being limited to, by the following Examples.

EXAMPLES

Materials
PA410
PA6
PPA-1: PA4T/6T/66
PPA-2: PA4T/6T
Stabilizer system: Masterbatch containing 20 mass % of iron particles in polyethylene and Copper Iodide/potassium iodide
Additives: AC540-A and Rowalid PA-10331 (color masterbatch)

Example 1 (EX 1)

polyamide composition comprising:
54 wt. % of a polyamide component: PA410 and PPA-1 (30/70 wt.),
3.7 wt. % of a stabilizer system containing elementary iron and a copper salt
and the following additives:
    40 wt. % glass fibers,
    and
    2.3 wt % of additives (of which 2 wt. % color masterbatch).

Example 2 (EX 2)

polyamide composition comprising:
54 wt. % of a polyamide component: PA410 and PPA-2 (30/70 wt.),
3.7 wt. % of a stabilizer system containing elementary iron and a copper salt
and the following additives:
    40 wt. % glass fibers,
    and
    2.3 wt % of additives (of which 2 wt. % color masterbatch).

Example 3 (EX 3)

polyamide composition comprising
54 wt. % of a polyamide component: PA410 and PPA-2 (50/50)
3.7 wt. % of a stabilizer system containing elementary iron and a copper salt
and the following additives:
    40 wt. % glass fibers,
    and
    2.3 wt % of additives (of which 2 wt. % color masterbatch).

Example 4 (EX 4)

polyamide composition comprising
55.9 wt. % of a polyamide component: PA410 and PPA-2 (30/70)
1.8 wt. % of a stabilizer system containing elementary iron and a copper salt
and the following additives:
    40 wt. % glass fibers,
    and
    2.3 wt % of additives (of which 2 wt. % color masterbatch).

Comparative Example 1 (CE 1)

polyamide composition comprising
54 wt. % of a polyamide component: PA6 and PPA-2 (30/70)
3.7 wt. % of a stabilizer system containing elementary iron and a copper salt
and the following additives:
    40 wt. % glass fibers,
    and
    2.3 wt % of additives (of which 2 wt. % color masterbatch).

Examples and Comparative Experiments

The compositions of Examples 1 to 4 and Comparative Example 1 were prepared using a ZSK 25 twin-screw extruder (ex Werner & Fleiderer). The cylinder temperature of the extruder was 350° C., rotation speed of the screws 275 RPM and the throughput 20 kg/hour. All ingredients except the reinforcing agent were added via a hopper at the throat. The reinforcing agent was added to the melt by side dosing. The compounded material was extruded in the form of strands, cooled in a water bath and cut into granules. The resulting granulate was dried for 16 hours at 105° C. under vacuum.

The dried granulate was injection moulded on an injection moulding machine type 75 (ex Engel) with a screw diameter of 22 mm in the form of test bars with a thickness of 4 mm and conforming ISO 527 type 1A. The temperature of the melt in the injection moulding machine was 360° C.; the temperature of the mould was 130° C.

The test bars were heat-aged in a GRENCO oven (type: GTTS 12500S) at 230° C. After a certain heat aging time, the test bars were taken out the oven, left to cool to room temperature and tested with respect to the mechanical properties by means of a tensile test according ISO 527 at 23° C.

The chemical resistance tests were performed by immersion in water based $H_2SO_4$ solutions at pH 1 at 100° C., or at various pH values, and taken out after specified amount of time. Chemical resistance tests carried out can also be called chemical aging tests. The test bars were taken out of the acid solution, wiped dry and left to cool to room temperature and tested with respect to the mechanical properties by means of a tensile test according ISO 527 at 23° C. Prior to the immersion in the dilute $H_2SO_4$ solutions the weight of the individual bars was determined gravimetrically. This measurement was repeated after the immersion period and the mass uptake of the individual bars was subsequently determined.

The compositions and typical test results for Examples 1 to 4 (EX 1 to EX 4) and Comparative Example 1 (CE 1) have been collected in Tables 1, 2, 3 and 4.

TABLE 1 retention of tensile strength after heat ageing at 230° C. and retention tensile strength after chemical resistance test at pH 1

|  | EX 1 | EX 2 | EX 3 | CE 1 |
|---|---|---|---|---|
| tensile strength retention 3000 hrs 230° C. [%] | 86 | 75 | 86 | 58 |
| tensile strength retention 1024 hrs pH1 [%] | 32 | 45 | 40 | 23 |

TABLE 2 retention of elongation at break (Eab) in % after chemical test at pH 1 and 100° C.

|  | EX 2 | EX 3 | EX 4 | CE 1 |
|---|---|---|---|---|
| Eab at 0 hrs | 100 | 100 | 100 | 100 |
| Eab after 1024 hrs | 60 | 62 | 90 | 33 |

TABLE 3 retention of tensile strength at pH 1 at temperature of 100° C. as a function of time

| Retention of tensile strength [%] | EX 1 | EX 2 | EX 3 | EX 4 | CE 1 |
|---|---|---|---|---|---|
| 0 hr | 100 | 100 | 100 | 100 | 100 |
| 48 hr | 50 | 55 | 51 | 67 | 40 |

TABLE 3-continued retention of tensile strength at pH
1 at temperature of 100° C. as a function of time

| Retention of tensile strength [%] | EX 1 | EX 2 | EX 3 | EX 4 | CE 1 |
|---|---|---|---|---|---|
| 100 hrs | 43 | 45 | 45 | 59 | 36 |
| 525 hrs | 27 | 34 | 34 | 45 | 23 |

TABLE 4 water uptake after 100 hrs at
temperature of 100° C. at different pH [%]

|  | EX 2 | EX 3 | EX 4 | CE 1 |
|---|---|---|---|---|
| pH 1.5 | 4.4 | 4.2 | 3.7 | 5.5 |
| pH 2 | 4.8 | 4.4 | 3.6 | 5.6 |
| pH 3 | 4.5 | 4.4 | 3.6 | 5.6 |

CE1 shows that a formulation containing PA6 as aliphatic shows a lower retention of properties both after heat aging and after chemical aging (table 1). Surprisingly when PA6 in the formulation is replaced by an aliphatic polyamide according to the present invention (having a C/N ratio equal to or above 6.5) both the heat aging performance and the retention of properties after chemical aging improve significantly. Further, the experimental data as indicated in tables 2-4 show also significantly better properties with the material tested in Examples 1 to 4.

Summarizing, the above shows that when a polyamide composition does not have a polyamide component a) combined with the stabilizer b) having the features according to the present invention, the polyamide composition does not present a chemical resistance and a heat aging performance under acidic conditions as good as when component a) and b) consists of the features as described in the present invention.

The invention claimed is:

1. A thermoplastic composition comprising:
a) a polyamide component comprising at least three amide monomer units, wherein the polyamide component comprises:
(i) from 20 to 60 wt. %, relative to total weight of the polyamide component a), at least one aliphatic polyamide comprising at least one aliphatic monomer unit of the at least three amide monomer units having a carbon to nitrogen ratio (C/N) equal to 7 or above, and
(ii) from 40 to 80 wt. %, relative to the total weight of the polyamide component a), of at least one semi-crystalline semi-aromatic polyamide comprising at least two semi-crystalline semi-aromatic amide monomer units of the at least three amide monomer units and being selected from the group consisting of PA4T/6T and PA4T/6T/66 having a melting temperature of at least 290° C. as measured by DSC at a heating rate of 10° C./min according to standard ISO 11357-3 (2009); and
(b) a stabilizer system comprising elemental iron particles and a copper salt, wherein
the composition exhibits, after 1024 hours of immersion in a water based $H_2SO_4$ solution at pH1 at 100° C., a tensile strength retention of 32% and above, and an elongation at break (Eab) of 60% and above.

2. The thermoplastic composition according to claim 1, wherein the aliphatic amide monomer unit has a carbon to nitrogen ratio (C/N) in the range from 7 to 24.

3. The thermoplastic composition according to claim 1, wherein the aliphatic amide monomer unit has a carbon to nitrogen ratio in the range from 7 to 11.

4. The thermoplastic composition according to claim 1, wherein the aliphatic amide monomer unit has a carbon to nitrogen ratio in the range from 12 to 18.

5. The thermoplastic composition according to claim 1, wherein the aliphatic amide monomer unit has a carbon to nitrogen ratio in the range from 19 to 24.

6. The thermoplastic composition according to claim 1, wherein the aliphatic polyamide is present in an amount from 30 to 50 wt. % relative to the total amount of the amide monomer units in the polyamide component, and wherein the semi-crystalline semi-aromatic polyamide is present in an amount from 50 to 70 wt. % relative to the total amount of the amide monomer units in the polyamide component.

7. The thermoplastic composition according to claim 1, wherein the polyamide component a) is a blend consisting of:
(i) one aliphatic polyamide originating from an aliphatic amide monomer unit having a carbon to nitrogen ratio (C/N) equal to 7 and above; and
(ii) one polyamide copolymer having a melting temperature of at least 290° C. as measured by DSC at a heating rate of 10° C./min according to standard ISO 11357-3 (2009), originating from at least two semi-aromatic amide monomer units.

8. The thermoplastic composition according to claim 1, wherein the polyamide component a) is a blend consisting of:
(i) two aliphatic polyamides, wherein a first one of the aliphatic polyamides has a carbon to nitrogen ratio (C/N) equal to 6 and above, and a second one of the aliphatic polyamides has a having a carbon to nitrogen ratio (C/N) equal to 7 and above, and
(ii) one polyamide copolymer having a melting temperature of at least 290° C. as measured by DSC at a heating rate of 10° C./min according to standard ISO 11357-3 (2009), originating from at least two semi-aromatic amide monomer units.

9. The thermoplastic composition according to claim 1, wherein the polyamide component a) is a blend consisting of:
(i) one aliphatic polyamide having a carbon to nitrogen ratio (C/N) equal to 7 and above, and
(ii) one polyamide copolymer having a melting temperature of at least 290° C. as measured by DSC at a heating rate of 10° C./min according to standard ISO 11357-3 (2009), originating from one aliphatic amide monomer unit having a carbon to nitrogen ratio (C/N) equal to, or above 7 and from at least two semi-aromatic amide monomer units.

10. The thermoplastic composition according to claim 1, wherein the stabilizer system b) further comprises iron oxide.

11. The thermoplastic composition according to claim 1, wherein the stabilizer system comprises elemental iron particles and copper iodide/potassium iodide.

12. The thermoplastic composition according to claim 11, wherein the stabilizer system is a masterbatch comprising 20 mass % of the elemental iron particles in polyethylene.

* * * * *